United States Patent [19]

Mark et al.

[11] 4,438,241

[45] Mar. 20, 1984

[54] HEAT RESISTANT POLYARYLATES

[75] Inventors: Victor Mark, Evansville; Charles V. Hedges, Mt. Vernon, both of Ind.

[73] Assignee: General Electric Company, Mt. Vernon, Ind.

[21] Appl. No.: 453,106

[22] Filed: Dec. 27, 1982

[51] Int. Cl.³ .................... C08G 63/18; C08G 63/66; C08G 63/68
[52] U.S. Cl. ................................ 525/444; 525/437; 528/125; 528/128; 528/173; 528/176; 528/191; 528/193; 528/194
[58] Field of Search ............... 528/125, 128, 173, 176, 528/191, 193, 194; 525/437, 444

[56] References Cited

U.S. PATENT DOCUMENTS

| | | | |
|---|---|---|---|
| 3,317,464 | 5/1967 | Conix | 528/176 |
| 3,351,624 | 11/1967 | Conix | 528/176 |
| 3,498,950 | 3/1970 | Shatz et al. | 528/176 |
| 4,294,956 | 10/1981 | Berger et al. | 528/176 |

Primary Examiner—Lester L. Lee
Attorney, Agent, or Firm—Martin B. Barancik

[57] ABSTRACT

Polyarylates derived from (i) at least one aromatic dicarboxylic acid or a reactive derivative thereof, and (ii) at least one cycloalkylidene dihydric phenol, wherein said cycloalkylidene contains from 8 to about 16 carbon atoms in the ring structure.

32 Claims, No Drawings

HEAT RESISTANT POLYARYLATES

BACKGROUND OF THE INVENTION

Polyarylates are high molecular weight thermoplastic resins which, due to their many advantageous properties, are finding increasing use as engineering thermoplastic materials in many commercial and industrial applications. Polyarylates are generally linear aromatic polymers containing repeating aromatic ester structural units in the polymer chain. The polyarylates are in general derived from dihydric phenols and aromatic dicarboxylic acids or their reactive derivatives.

While conventional polyarylates are in general quite suitable for a wide variety of uses, there nevertheless exists a need, especially in high temperature environments, for polyarylates exhibiting, to a substantial degree, most of the advantageous properties of conventional polyarylates and simultaneously exhibiting higher heat resistance than that possessed by conventional polyarylates.

It is, therefore, an object of the instant invention to provide polyarylates which exhibit, to a substantial degree, substantially most of the advantageous properties of conventional polyarylates while simultaneously exhibiting improved heat resistance.

SUMMARY OF THE INVENTION

In accordance with the instant invention there are provided novel polyarylates exhibiting, to a substantial degree, substantially most of the advantageous properties of conventional polyarylates and simultaneously exhibiting improved heat resistance. The polyarylates of the instant invention are formulated by coreacting (i) at least one aromatic dicarboxylic acid; and (ii) a cycloalkylidene containing dihydric phenol wherein said cycloalkylidene contains from 8 to about 16 ring carbon atoms.

DESCRIPTION OF THE INVENTION

In accordance with the instant invention there are provided polyarylate resins exhibiting improved heat resistance. These polyarylates are derived from (i) at least one aromatic dicarboxylic acid or a reactive derivative thereof; and (ii) at least one cycloalkylidene dihydric phenol, wherein said cycloalkylidene contains from 8 to about 16 carbon atoms in the ring structure.

The cycloalkylidene dihydric phenols are represented by the general formula

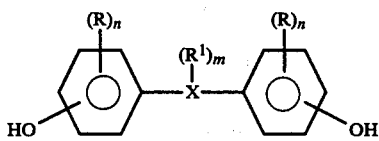

wherein:

R is independently selected from halogen radicals, monovalent hydrocarbon radicals, and monovalent hydrocarbonoxy radicals;

$R^1$ is independently selected from monovalent hydrocarbon radicals;

X is selected from cycloalkylidene radicals containing from 8 to about 16 carbon atoms;

n is independently selected from whole numbers having a value of from 0 to 4 inclusive; and m represents a whole number having a value from 0 up to the number of replaceable hydrogen atoms present on X.

The halogen radicals represented by R are preferably selected from chlorine and bromine.

The monovalent hydrocarbonoxy radicals represented by R are preferably selected from alkoxy radicals and aryloxy radicals. The preferred alkoxy radicals are those containing from 1 to about 8 carbon atoms. Some illustrative non-limiting examples of these preferred alkoxy radicals include methoxy, ethoxy, propoxy, butoxy, isopropoxy, and the like. The preferred aryloxy radical is the phenoxy radical.

The monovalent hydrocarbon radicals represented by R are selected from alkyl radicals, aryl radicals, alkaryl radicals, aralkyl radicals, and cycloalkyl radicals. The preferred alkyl radicals represented by R are those containing from 1 to about 8 carbon atoms. Some illustrative non-limiting examples of these preferred alkyl radicals include methyl, ethyl, propyl, isopropyl, butyl, isobutyl, tertiaty butyl, pentyl, neopentyl, and the like. The preferred aryl radicals represented by R are those containing from 6 to 12 carbon atoms and include phenyl, naphthyl and biphenyl. The preferred aralkyl and alkaryl radicals represented by R are those containing from 7 to about 14 carbon atoms. Some illustrative non-limiting examples of these prefrred aralkyl and alkaryl radicals include benzyl, tolyl, ethylphenyl, and the like. The preferred cycloalkyl radicals represented by R are those containing from 4 to 6 ring carbon atoms. Some illustrative non-limiting examples of these preferred cycloalkyl radicals include cyclobutyl, cyclopentyl, cyclohexyl, methylcyclohexyl, and the like.

Preferably R is independently selected from monovalent hydrocarbon radicals, with the alkyl radicals being the preferred monovalent hydrocarbon radicals.

The monovalent hydrocarbon radicals represented by $R^1$ are selected from alkyl radicals, aryl radicals, alkaryl radicals, aralkyl radicals, and cycloalkyl radicals. The preferred alkyl radicals are those containing from 1 to about 8 carbon atoms. Some illustrative non-limiting examples of these preferred alkyl radicals include methyl, ethyl, propyl, isopropyl, butyl, isobutyl, and the like. The preferred aryl radicals are those containing from 6 to 12 carbon atoms, i.e., phenyl, naphthyl and biphenyl. The preferred aralkyl and alkaryl radicals are those containing from 7 to about 14 carbon atoms. Some illustrative non-limiting examples of these preferred aralkyl and alkaryl radicals include benzyl, tolyl, ethylphenyl, and the like. The preferred cycloalkyl radicals represented by $R^1$ are those containing from 4 to 6 ring carbon atoms. These include cyclobutyl, cyclopentyl, cyclohexyl, methylcyclohexyl, and the like.

The preferred monovalent hydrocarbon radicals represented by $R^1$ are the alkyl radicals.

In the dihydric phenol compound of Formula I when more than one R substituent is present on the aromatic residue they may be the same or different.

Likewise, if more than one $R^1$ substituent is present on the cycloalkylidene radical represented by X they may be the same or different.

In Formula I m preferably represents a whole number having a value of from 0 to about 6.

The novel dihydric phenols of Formula I, and method for their preparation, are more fully disclosed in copending U.S. Application of Mark and Hedges, Ser. No. 045,105, filed on the same day as the instant application, which is hereby incorporated herein by reference.

Some non-limiting illustrative examples of the dihydric phenols of Formula I include:

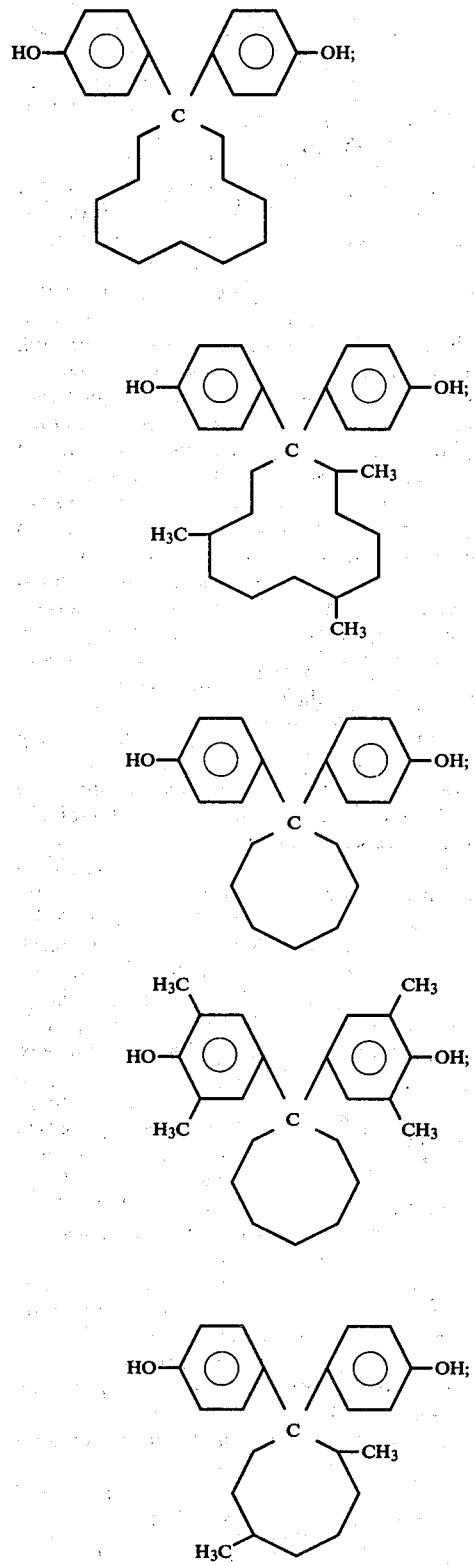

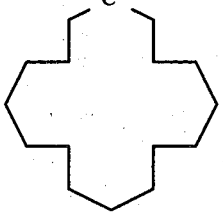

and the like.

The preferred dihydric phenols of Formula I are the 4,4'-dihydric phenols.

The dihydric phenols of Formula I may be prepared by the coreaction of a particular cyclic ketone and a phenol in the presence of an acid catalyst, and preferably in the presence of an acid catalyst and a co-catalyst such as butyl mercaptan.

The particular cyclic ketone reactant is selected from ketones represented by the general formula

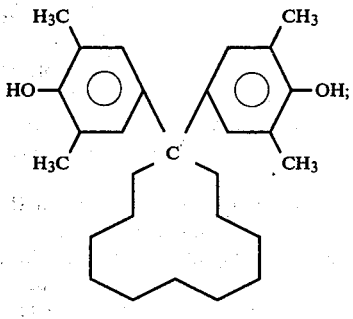

wherein $R^1$, m and X are as defined hereinafore. More particularly, the ketone of Formula II may be represented by the general formula

wherein $R^1$ is as defined hereinafore, Y is selected from alkylene radicals containing from 7 to about 15 carbon atoms which together with the

radical form a cyclic structure containing from 8 to about 16 carbon atoms, and m' represents a whole number having a value of from 0 up to the number of replaceable hydrogen atoms on Y.

The phenol reactants are selected from phenols represented by the general formula

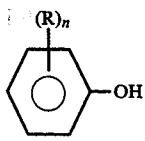

(IV)

wherein R and n are as defined above.

In order to obtain the dihydric phenols of Formula I one mole of the ketone of Formula III is reacted with two moles of the phenol of Formula IV in the presence of an acid catalyst, and preferably in the presence of and acid catalyst and a co-catalyst such as butyl mercaptan. Generally, the phenol reactant is present in excess. Rather than utilizing only one phenol of Formula IV a mixture of two or more different phenols of Formula IV may be employed.

In the preparation of the polyarylates of the instant invention only one dihydric phenol of Formula I may be employed. Alternately, a mixture of two or more different dihydric phenols of Formula I may be utilized.

The aromatic dicarboxylic acids which are reacted with at least one dihydric phenol represented by Formula I to produce the polyarylates of the instant invention are well known and are generally commercially available or may readily be prepared by known methods. In general, any aromatic dicarboxylic acid conventionally used in the preparation of polyesters may be utilized. These aromatic carboxylic acids may be represented by the general formula

HOOC—Ar—COOH (V)

wherein Ar is selected from divalent aromatic radicals, preferably those containing from 6 to about 18 carbon atoms, such as phenylene, naphthylene, biphenylene, substituted phenylene, and the like. These divalent aromatic radicals, when substituted, are preferably substituted with monovalent hydrocarbon radicals and halogen radicals, preferably chlorine and bromine. The monovalent hydrocarbon radicals are the same as those defined for R hereinafore. In Formula V Ar may also be selected from divalent radicals of the type —Ar'—R$^2$—Ar'— wherein Ar' is independently selected from divalent aromatic radicals of the type described for Ar, and R$^2$ is selected from alkylene radicals containing from 2 to about 6 carbon atoms and alkylidene radicals containing from 1 to about 6 carbon atoms.

Preferred aromatic dicarboxylic acids of Formula V are those represented by the general formula

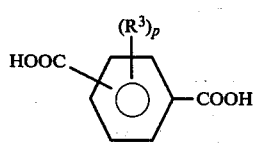

(VI)

wherein R$^3$ is independently selected from alkyl radicals, preferably those containing from 1 to about 6 carbon atoms, and halogen radicals, preferably chlorine and bromine; and p represents a whole number having a value of from 0 to 4 inclusive. In Formula VI when more than one R$^3$ substituent is present they may be the same or different.

Some illustrative non-limiting examples of aromatic dicarboxylic acids represented by Formula VI include isophthalic acid, terephthalic acid, and the like.

It is possible, in preparing the instant polyarylates, to use only one dicarboxylic acid of Formula V, or to employ a mixture of two or more different dicarboxylic acids. Thus, when the term aromatic dicarboxylic acid is used herein it is meant to include individual aromatic dicarboxylic acids, and mixtures of two or more different aromatic dicarboxylic acids.

Instead of using the aromatic dicarboxylic acids per se it is possible, and sometimes even preferred, to utilize their respective reactive derivatives. The preferred reactive derivatives are the acid dihalides, with the acid chlorides being the preferred acid halides. Thus, for example, instead of utilizing isophthalic acid, terephthalic acid, and mixtures thereof, it is possible to utilize isophthloyl dichloride, terephthaloyl dichloride, and mixtures thereof.

The preparation of the instant polyarylates from the instant dihydric phenols and the aromatic dicarboxylic acids or their reactive derivatives may be accomplished by known methods such as, for example, heterogeneous interfacial polymerization, solution condensation polymerization, melt condensation polymerization, and the like.

Most conveniently, the instant polyarylates may be prepared from equimolar or nearly equimolar amounts of (i) at least one dihydric phenol of Formula I, and (ii) at least one aromatic dicarboxylic acid or a reactive derivative thereof by the interfacial polymerization technique. In accordance with the usual interfacial polymerization procedure, the reactants are present in different liquid phases which are immiscible and which, in the preparation of the present polymers, constitute two solvent media. Thus the dihydric phenol is dissolved in one solvent medium, the aromatic dicarboxylic acid or its reactive derivative such as the acid dichloride is dissolved in a second solvent medium immiscible with the first, and the solutions are combined. Normally, an alkaline aqueous medium serves as the solvent for the dihydric phenol, and an organic solvent is utilized for the acid or its reactive derivative, said organic solvent being so chosen that it either dissolves the polyarylate produced or serves as a swelling medium therefor. Also present during the reaction are catalysts and chain stoppers or molecular weight regulators.

The catalysts which can be employed in the interfacial polymerization process may be any of the well known catalysts that aid the interfacial polymerization reaction of the dihydric phenol and the aromatic dicarboxylic acid or its reactive derivative. Suitable catalysts include, but are not limited to, tertiary amines such as triethylamine, quaternary ammonium compounds, and quaternary phosphonium compounds, and the like.

The molecular weight regulators employed may be any of the well known compounds that regulate the molecular weight of the polyarylates by a chain-stopping or terminating mechanism. These compounds include, but are not limited to, phenol, chroman-I, tertiary-butyl phenol, and the like.

The temperature at which the polymerization reaction proceeds may vary from below 0° C. to above 100° C. The polymerization reaction proceeds satisfactorily at temperatures from room temperature (25° C.) to about 50° C.

The polyarylates of the instant invention generally have a weight average molecular weight in the range of from about 10,000 to about 200,000, preferably in the range of from about 20,000 to about 100,000.

The instant polyarylates exhibit improved heat resistance as compared with conventional currently available polyarylates.

The polyarylates of the instant invention may optionally have admixed therewith the commonly known and used additives such as antioxidants; antistatic agents; fillers such as glass fibers, talc, mica, clay, and the like; ultraviolet radiation absorbers such as the benzophenones and the benzotriazoles; hydrolytic stabilizers such as the epoxides disclosed in U.S. Pat. Nos. 3,489,716; 3,138,379 and 3,839,247, all of which are incorporated herein by reference; color stabilizers such as the organophosphites; flame retardants; and the like.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559. 3,951,910 and 3,940,366, all of which are hereby incorporated herein by reference.

Another embodiment of the instant invention is a polyarylate derived from (i) at least one aromatic dicarboxylic acid or a reactive derivative thereof; (ii) at least one dihydric phenol represented by Formula I; and (iii) at least one conventional dihydric phenol represented by the general formula

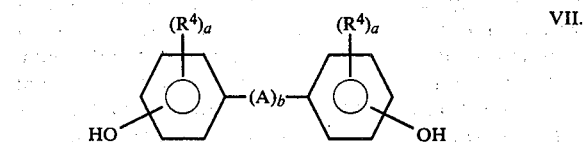

VII.

wherein:

A represents an alkylene radical containing from 2 to about 6 carbon atoms, an alkylidene radical containing from 1 to about 6 carbon atoms,

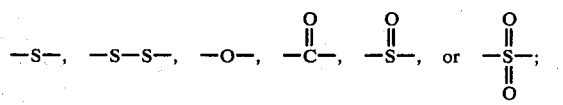

$R^4$ is independently selected from halogen radicals, monovalent hydrocarbonoxy radicals, and monovalent hydrocarbon radicals;

a is independently selected from a whole number having a value from 0 to 4 inclusive; and b is zero or one.

The halogen radicals, monovalent hydrocarbonoxy radicals, and monovalent hydrocarbon radicals represented by $R^4$ are those as disclosed hereinafore for R.

Preferred dihydric phenols of Formula VII are those wherein b is one and A is an alkylene or an alkylidene radical.

Some illustrative non-limiting examples of the dihydric phenols of Formula VII include:
2,2-bis(4-hydroxyphenyl)propane (bisphenol-A);
bis(3-methyl-4-hydroxyphenyl)methane;
2,2-bis(3,5-dimethyl-4-hydroxyphenyl)propane;
2,2-bis(3,5-dibromo-4-hydroxyphenyl)propane;
2,2-bis(3,5-dimethyl-4-hydroxyphenyl)butane;
1,4-bis(3-bromo-5-methyl-4-hydroxyphenyl)butane; and the like.

The amount of the dihydric phenol of Formula I employed in the preparation of the polyarylate of this embodiment is an amount effective to improve the heat resistance of the polyarylate. Generally, this amount is in the range of from about 5 to about 90 weight percent, preferably from about 10 to about 80 weight percent, based on the total amounts of the dihydric phenols of Formula I and Formula VII utilized.

The procedure for preparing the polyarylates of this embodiment is generally similar to that described hereinafore except for the presence of the dihydric phenol of Formula VII in the reaction mixture.

The polyarylates of this embodiment may optionally have admixed therewith the various additives described hereinafore.

Yet another embodiment of the instant invention is a physical blend of (i) at least one polyarylate of the instant invention, i.e., one derived from (a) at least one aromatic dicarboxylic acid or a reactive derivative thereof, and (b) at least one dihydric phenol of Formula I; and (ii) a conventional polyarylate, i.e., one derived from (a) at least one aromatic dicarboxylic acid or a reactive derivative thereof, and (b) at least one dihydric phenol of Formula VII.

These blends contain an amount of the polyarylate of the instant invention effective to improve the heat resistance of said blends. This amount is generally in the range of from about 5 to about 90 weight percent, and preferably from about 10 to about 80 weight percent, based on the total amount of polyarylate resins present in the blends.

The instant blends exhibit improved heat resistance relative to blends containing conventional polyarylate resins.

The method of preparing the instant blends is not critical and does not constitute part of this invention. One method of preparing the instant blends, for example, comprises blending the two resins together in powder or granular form, extruding the blend, chopping into pellets, and reextruding.

The blends of this embodiment may optionally contain the aforedescribed additives.

DESCRIPTION OF THE PREFERRED EMBODIMENT

The following examples are set forth to further illustrate the present invention, and are not to be considered as limiting the invention thereto. Unless otherwise specified, where parts or percents are mentioned, they are parts of percents by weight.

EXAMPLE 1

This example illustrates the preparation of 4,4'-cyclododecylidenebisphenol

To a 3 liter flask equipped with a stirrer, reflux condenser, thermometer and gas inlet tube, were charged 1647 grams (17.5 moles) of phenol, 478 grams (2.62 moles) of cyclododecanone, and 15 milliliters of n-butylmercaptan. Heat was applied via a heating mantel and when the reaction mixture became liquid at 58° C., anhydrous hydrogen chloride was introduced until the solution became saturated. Stirring was continued between 52° and 60° C. for several hours, during which period white solids began to separate out from the reddish-orange reaction mixture. When gas chromatographic analysis of the samples taken from the slurry indicated the absence of the macrocyclic ketone, the warm reaction mixture was filtered by suction and the resultant filter cake was washed with methylene chloride in order to remove much of the excess phenol. The filter cake was then slurried up with fresh methylene chloride, filtered and rinsed again with more solvent. Analysis by gas chromatography of the dried filter cake, which weight 849.8 grams (2.41 moles), corresponding to a 92% yield, and melted at 207.0°–208.5° C., indicated that it was 99.9% pure and that it had a retention time of 26.07 minutes relative to p-cumylphenol, which emerged at 13.91 minutes.

EXAMPLE 2

This example illustrates the preparation of a polyarylate of the instant invention.

To a reactor vessel were added 400 milliliters of methylene chloride, 300 milliliters of water, 35.2 grams of 4,4'-cyclododecylidenebisphenol prepared substantially in accordance with the procedure of Example 1, 0.05 gram of phenol, and 0.28 milliliter of triethylamine. At a pH of about 11, 20.3 grams of isophthaloyl dichloride were added over a 15 minute period, while maintaining the pH at about 11 by the addition of 35% aqueous caustic solution. The resulting mixture was stirred at ambient temperatures for 20 minutes. The polyner mixture was diluted with methylene chloride and the brine phase was separated. The resulting polymer containing phase was washed with HCl and then with water, and the polymer was then recovered by steam precipitation. The resultant polyarylate had an intrinsic viscosity in methylene chloride at 25° C. of 0.297 dl/gm. and a second order glass transition temperature of 247.4° C.

In contrast to the Tg of 247.4° C. of the instant polyarylate of Example 2, a conventional polyarylate derived from bisphenol-A and isophthalic acid (isophthaloyl dichloride) exhibits a Tg of about 180° C. The instant polyarylates thus exhibit improved heat resistance, as evidenced by improved glass transition temperature (Tg), over conventional polyarylates.

It will thus be seen that the objects set forth above, among those made apparent from the preceding description, are efficiently attained, and since certain changes may be made in carrying out the above processes and the compositions set forth without departing from the scope of the invention, it is intended that all matters contained herein shall be interpreted as illustrative and not in a limiting sense.

What is claimed is:

1. Polyarylate compositions exhibiting improved heat resistance comprised of (i) at least one polyarylate prepared by reacting:
   (a) at least one aromatic dicarboxylic acid or a reactive derivative thereof; and
   (b) at least one dihydric phenol represented by the general formula

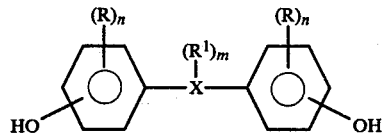

wherein:

R is independently selected from halogen radicals, monovalent hydrocarbon radicals, and monovalent hydrocarbonoxy radicals;

$R^1$ is independently selected from monovalent hydrocarbon radicals;

X is selected from cycloalkylidene radicals containing from at least 8 to about 16 ring carbon atoms;

n is independently selected from whole numbers having a value of from 0 to 4 inclusive; and m represents a whole number having a value of from 0 up to the number of replaceable hydrogen atoms present on X.

2. The compositions of claim 1 wherein said monovalent hydrocarbon radicals represented by $R^1$ are selected from alkyl radicals, aryl radicals, aralkyl radicals, and cycloalkyl radicals.

3. The compositions of claim 3 wherein said monovalent hydrocarbon radicals are selected from alkyl radicals.

4. The compositions of claim 2 wherein said halogen radicals represented by R are selected from chlorine and bromine.

5. The compositions of claim 2 wherein said monovalent hydrocarbonoxy radicals are selected from alkoxy radicals and aryloxy radicals.

6. The compositions of claim 2 wherein said monovalent hydrocarbon radicals represented by R are selected from alkyl radicals, aryl radicals, alkaryl radicals, aralkyl radicals, and cycloalkyl radicals.

7. The compositions of claim 6 wherein said monovalent hydrocarbon radicals represented by R are alkyl radicals.

8. The compositions of claim 2 wherein said dihydric phenol is a 4,4'-dihydric phenol.

9. The compositions of claim 3 wherein said dihydric phenol is a 4,4'-dihydric phenol.

10. The compositions of claim 9 wherein n is zero.

11. The compositions of claim 10 wherein m is zero.

12. The compositions of claim 9 wherein m is zero.

13. The compositions of claim 12 wherein said dihydric phenol is 4,4'-cyclododecylidene bisphenol.

14. The compositions of claim 2 wherein said aromatic dicarboxylic acid is selected from isophthalic acid, terephthalic acid, and mixtures thereof.

15. The compositions of claim 13 wherein said aromatic dicarboxylic acid is selected from isophthalic acid, terephthalic acid, and mixtures thereof.

16. The compositions of claim 1 which further contain (ii) at least one polyarylate prepared by reacting:
   (c) at least one aromatic dicarboxylic acid or a reactive derivative thereof; and
   (d) at least one dihydric phenol represented by the general formula

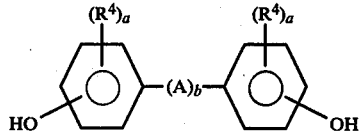

wherein:

A is selected from alkylene radicals, alkylidene radicals,

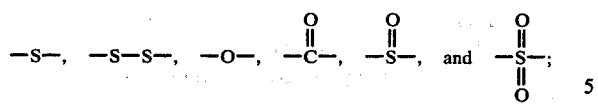

R⁴ is independently selected from halogen radicals, monovalent hydrocarbonoxy radicals, and monovalent hydrocarbon radicals;

b is either zero or one; and n is independently selected from whole numbers having a value of from 0 to 4 inclusive.

17. The compositions of claim 16 which contain an amount of resin (i) effective to improve the heat resistance of said compositions.

18. The compositions of claim 17 wherein said amount is in the range of from about 5 to about 90 weight percent, based on the total amount of resins (i) and (ii) present.

19. The compositions of claim 17 wherein said monovalent hydrocarbon radicals represented by $R^1$ are selected from alkyl radicals, aryl radicals, alkaryl radicals, aralkyl radicals, and cyclaolkyl radicals.

20. The compositions of claim 19 wherein A is selected from alkylene radicals and alkylidene radicals.

21. The compositions of claim 20 wherein b is one.

22. The compositions of claim 21 wherein said dihydric phenol of (i)(b) is a 4,4'-dihydric phenol.

23. The compositions of claim 22 wherein said dihydric phenol (ii)(d) is a 4,4'-dihydric phenol.

24. The compositions of claim 23 wherein said aromatic dicarboxylic acid is selected from isophthalic acid, terephthalic acid, and mixtures thereof.

25. The compositions of claim 1 wherein said polyarylate is prepared by reacting:

(a);

(b); and (e) at least one dihydric phenol represented by the general formula

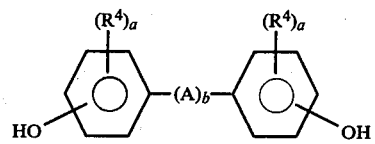

wherein:

A is selected from alkylene radicals, alkylidene radicals,

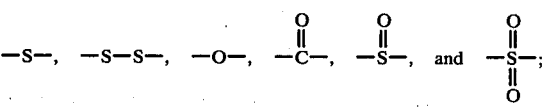

R⁴ is independently selected from halogen, monovalent hydrocarbonoxy, and monovalent hydrocarbon radicals;

b is either zero or one; and n is independently selected from whole numbers having a value of from 0 to 4 inclusive.

26. The compositions of claim 25 which contain an amount of the dihydric phenol (b) effective to improve the heat resistance of said compositions.

27. The compositions of claim 26 wherein said amount is in the range of from about 5 to about 90 weight percent, based on the total amount of dihydric phenols (b) and (e) employed.

28. The compositions of claim 26 wherein said monovalent hydrocarbon radicals represented by $R^1$ are selected from alkyl radicals, aryl radicals, aralkyl radicals, alkaryl radicals, and cycloalkyl radicals.

29. The compositions of claim 28 wherein A is selected from alkylene radicals and alkylidene radicals.

30. The compositions of claim 29 wherein said dihydric phenol (e) is a 4,4'-dihydric phenol.

31. The compositions of claim 30 wherein said dihydric phenol (b) is a 4,4'-dihydric phenol.

32. The compositions of claim 31 wherein said aromatic dicarboxylic acid is selected from isophthalic acid, terephthalic acid, and mixtures thereof.

* * * * *